(12) United States Patent
Diguet et al.

(10) Patent No.: US 11,214,514 B2
(45) Date of Patent: Jan. 4, 2022

(54) OPTICAL FILM EXHIBITING IMPROVED LIGHT TO SOLAR GAIN HEAT RATIO

(71) Applicant: SAINT-GOBAIN PERFORMANCE PLASTICS CORPORATION, Solon, OH (US)

(72) Inventors: Antoine Diguet, Paris (FR); Charles Leyder, Cambridge, MA (US); Fabien Lienhart, San Diego, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 301 days.

(21) Appl. No.: 16/108,789

(22) Filed: Aug. 22, 2018

(65) Prior Publication Data
US 2018/0362395 A1    Dec. 20, 2018

Related U.S. Application Data

(62) Division of application No. 14/575,049, filed on Dec. 18, 2014, now Pat. No. 10,081,570.

(60) Provisional application No. 61/921,790, filed on Dec. 30, 2013.

(51) Int. Cl.
   *C03C 17/36*   (2006.01)
   *B32B 15/00*   (2006.01)
   *G02B 5/28*    (2006.01)

(52) U.S. Cl.
   CPC ............ *C03C 17/36* (2013.01); *B32B 15/00* (2013.01); *C03C 17/366* (2013.01); *C03C 17/3613* (2013.01); *C03C 17/3644* (2013.01); *G02B 5/282* (2013.01); *Y10T 428/12549* (2015.01)

(58) Field of Classification Search
   None
   See application file for complete search history.

(56) References Cited

U.S. PATENT DOCUMENTS

| | | |
|---|---|---|
| 5,183,700 A | 2/1993 | Austin |
| 5,296,302 A | 3/1994 | O'Shaughnessy et al. |
| 5,372,874 A | 12/1994 | Dickey et al. |
| 5,591,529 A | 1/1997 | Braatz et al. |
| 5,948,538 A | 9/1999 | Brochot et al. |
| 5,956,175 A | 9/1999 | Hojnowski |
| 6,030,671 A | 2/2000 | Yang |

(Continued)

FOREIGN PATENT DOCUMENTS

| | | |
|---|---|---|
| CN | 1708700 A | 12/2005 |
| CN | 101211735 A | 7/2007 |

(Continued)

OTHER PUBLICATIONS

Dai Dahuang, "Functional Thin Film and Its Deposition Preparation Technology," Beijing: Metallurgical Technology Press, Jan. 2013, pp. 357-358.

(Continued)

*Primary Examiner* — Xiaobei Wang
(74) *Attorney, Agent, or Firm* — Abel Schillinger, LLP; Chi Suk Kim

(57) ABSTRACT

The present disclosure is directed to optically transparent and IR reflecting films having a metal oxide based composite layer which can synergistically improve the optical properties, solar properties, and production speed of the whole composite.

16 Claims, 5 Drawing Sheets

(56) References Cited

U.S. PATENT DOCUMENTS

| | | |
|---|---|---|
| 6,210,784 B1 | 4/2001 | Rondeau et al. |
| 6,261,694 B1 | 7/2001 | Iacovangelo |
| 6,579,423 B2 | 6/2003 | Anzaki et al. |
| 6,589,658 B1 | 7/2003 | Stachowiak |
| 7,419,725 B2 | 9/2008 | Neuman et al. |
| 7,508,586 B2 | 3/2009 | Thielsch et al. |
| 7,709,095 B2 | 5/2010 | Persoone et al. |
| 7,740,946 B2 | 6/2010 | Morimoto et al. |
| 7,824,777 B2 | 11/2010 | Stoessel et al. |
| 2002/0136905 A1 | 9/2002 | Medwick et al. |
| 2004/0086723 A1 | 5/2004 | Thomsen et al. |
| 2006/0057399 A1 | 3/2006 | Persoone et al. |
| 2006/0078746 A1 | 4/2006 | Neuman et al. |
| 2007/0281178 A1 | 12/2007 | Hong et al. |
| 2007/0298265 A1 | 12/2007 | Morimoto et al. |
| 2008/0057264 A1 | 3/2008 | Morimoto et al. |
| 2008/0199670 A1 | 8/2008 | Yaoita et al. |
| 2008/0311389 A1 | 12/2008 | Roquiny et al. |
| 2009/0068384 A1 | 3/2009 | Seth et al. |
| 2009/0153989 A1 | 6/2009 | An et al. |
| 2009/0246552 A1 | 10/2009 | Stoessel et al. |
| 2010/0221575 A1 | 9/2010 | Stull |
| 2010/0316852 A1 | 12/2010 | Condo et al. |
| 2011/0135880 A1 | 6/2011 | Roman et al. |
| 2011/0212336 A1 | 9/2011 | Kawamoto et al. |
| 2011/0261442 A1 | 10/2011 | Knoll et al. |
| 2012/0028009 A1 | 2/2012 | Gerardin et al. |
| 2012/0076986 A1 | 3/2012 | Inuduka et al. |
| 2012/0152347 A1 | 6/2012 | Lee et al. |
| 2014/0022630 A1 | 1/2014 | Reymond et al. |
| 2014/0272354 A1* | 9/2014 | Ding .................. C03C 17/3639 428/216 |
| 2014/0322507 A1 | 10/2014 | Ding et al. |
| 2014/0363685 A1* | 12/2014 | Okawa .................. C03C 17/36 428/457 |
| 2015/0015940 A1 | 1/2015 | Nakajima |
| 2015/0103398 A1 | 4/2015 | Banerjee et al. |
| 2015/0183301 A1 | 7/2015 | Diguet et al. |
| 2017/0059750 A1 | 3/2017 | Diguet |
| 2017/0254936 A1 | 9/2017 | Morita |

FOREIGN PATENT DOCUMENTS

| | | |
|---|---|---|
| CN | 101243022 A | 8/2008 |
| CN | 101866063 A | 10/2010 |
| CN | 102483480 A | 5/2012 |
| CN | 104136946 A | 11/2014 |
| DE | 69510488 T2 | 2/2000 |
| EP | 1174397 A2 | 1/2002 |
| EP | 2030954 A1 | 3/2009 |
| EP | 1642159 B1 | 7/2013 |
| GB | 498503 A | 1/1939 |
| JP | 2000214304 A | 8/2000 |
| JP | 2009071146 A | 4/2009 |
| TW | 200804214 A | 1/2008 |
| WO | 9421838 A1 | 9/1994 |
| WO | 99/28258 A1 | 6/1999 |
| WO | 2006/122900 A1 | 11/2006 |
| WO | 2007/028060 A2 | 3/2007 |
| WO | 2007/120177 A1 | 10/2007 |
| WO | 2009/120175 A1 | 10/2009 |
| WO | 2013/053608 A1 | 4/2013 |
| WO | 2013/087064 A1 | 6/2013 |
| WO | 2014/191472 A2 | 12/2014 |
| WO | 2015/102923 A1 | 7/2015 |
| WO | 2017/035336 A1 | 3/2017 |

OTHER PUBLICATIONS

International Search Report from PCT/US2014/071123 dated Mar. 26, 2015, 1 page.
International Search Report and Written Opinion for PCT Application No. PCT/US2016/048655, dated Dec. 13, 2016, 12 pages.
Extended European Search Report for EP Application No. 15306314. 4, dated Feb. 18, 2016, 7 pages.
Extended European Search Report for EP Application No. 14877504. 2, dated Jun. 9, 2017, 10 pages.

* cited by examiner

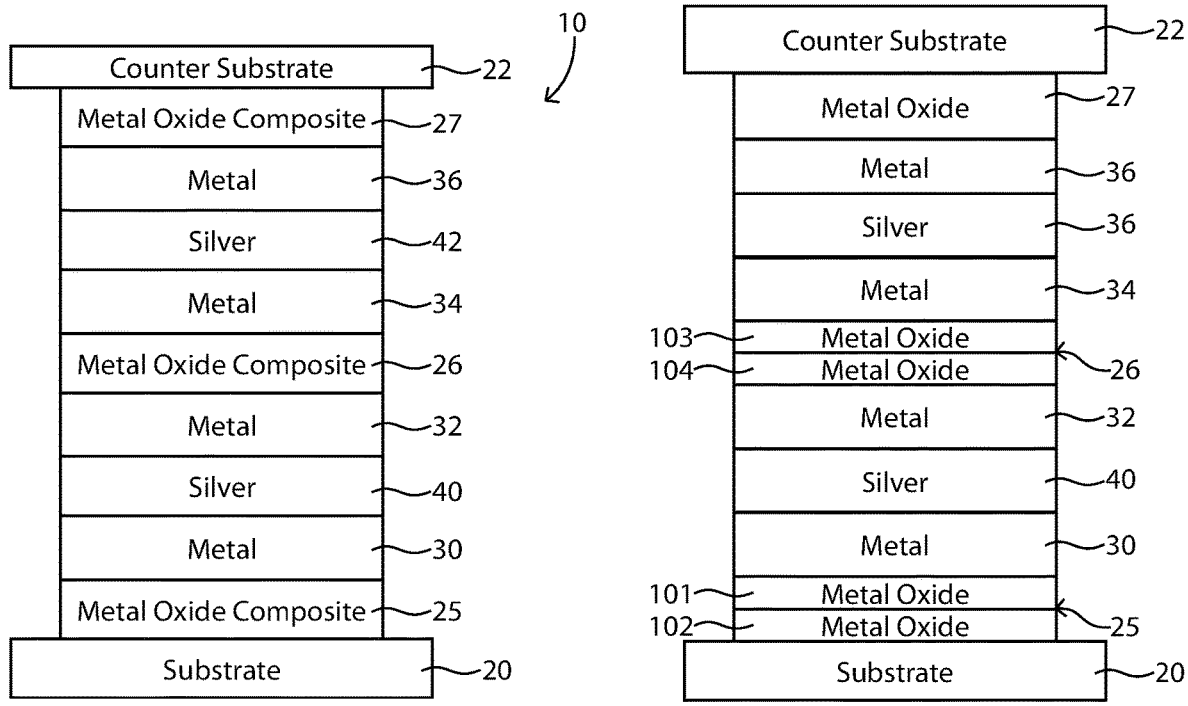
FIG. 1
FIG. 2
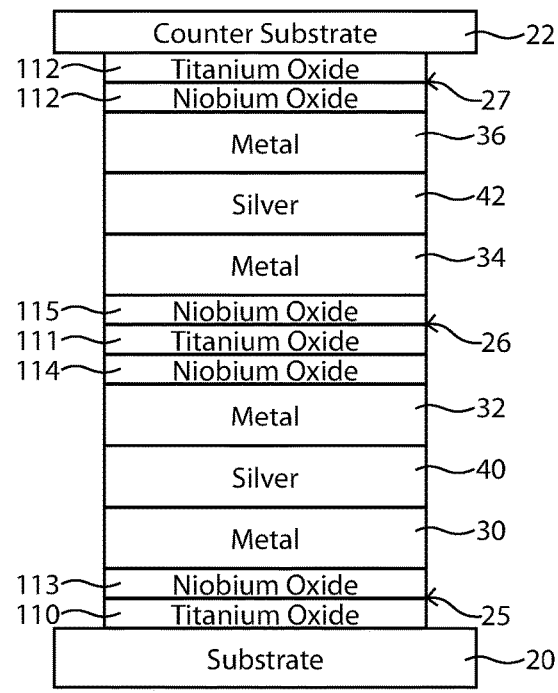
FIG. 3

OPTICAL FILM EXHIBITING IMPROVED LIGHT TO SOLAR GAIN HEAT RATIO

CROSS-REFERENCE TO RELATED APPLICATION(S)

This application is a divisional of and claims priority to U.S. patent application Ser. No. 14/575,049, entitled "OPTICAL FILM EXHIBITING IMPROVED LIGHT TO SOLAR GAIN HEAT RATIO," by Antoine Diguet et al., filed Dec. 18, 2014, which claims priority under 35 U.S.C. § 119(e) to U.S. Provisional Patent Application No. 61/921,790, filed Dec. 30, 2013, entitled "OPTICAL FILM EXHIBITING IMPROVED LIGHT TO SOLAR GAIN HEAT RATIO," by Antoine Diguet et al., which applications are assigned to the current assignee hereof and incorporated herein by reference in their entireties.

FIELD OF THE DISCLOSURE

The present disclosure relates to composite films, and more particularly to, infra-red reflecting and optically transparent composite films.

RELATED ART

Composites that reflect radiation in the infrared spectrum while transmitting radiation in the visible spectrum have important applications, for example, as coverings applied to windows in building or vehicles.

For such composite films, visual light transmittance must be high, and the reflectivity and absorptivity must be low. In the United States of America for example, automotive windshields must have a transmittance of visible light of at least 70%. In the infrared, however, the window must have high reflectivity and so transmittance and absorptivity in the infrared must be low. Ideally the reflectivity must be high in the near infrared part of the spectrum (780 nm-2500 nm) to prevent heating from the sun light and high in the far infrared (8 µm-50 µm) to keep heat inside of a car in winter. The latter feature is also called "low-emissivity". These combine features are of great importance especially under temperate climates.

It has been known to use thin silver layers in composite films to reflect infrared radiation; however, silver layers have a low stability, low durability and poor moisture and weather resistance. Additionally, further layers that can be added to the composite to combat the disadvantages of a thin silver layer generally negatively affect other properties such as visual light transmittance, haze, and yellowing.

U.S. Pat. No. 7,709,095 describes an infra-red reflecting layered structure in which the silver containing layer is contacted by a gold metal layer and a titanium oxide dielectric layer. The layers are deposited by a sputtering technique.

One disadvantage with the use of a titanium oxide dielectric layer is the limit in deposition rate from a sputtering technique using rotative ceramic targets. For example, a typical deposition rate for a sputter deposited titanium oxide layer for use in an optical film is about 1.5 nm·m$^2$·min$^{-1}$·kW$^{-1}$ on a single rotative ceramic target. It is noted that the deposition rate is independent of the target length and the applied power. In the process to produce the film, the deposition rate of titanium oxide considerably slows down the entire production speed of the composite.

Attempts have been made to improve the production speed by substituting the titanium oxide for other materials. However, it has heretofore not been known how to improve the production speed without negatively affecting one or both of optical and solar properties of the composite film such as transparency and reflectivity.

Furthermore, it has also been desired to improve the optical and solar properties of composite films. However, attempts to improve solar properties, such as TSER, hinder the optical performance, such as the visual light transmittance (VLT) and vice versa.

Therefore, a need exists to develop new materials and methods to increase the deposition rate of the dielectric layers without sacrificing performance, and even improving the performance of the optical film.

BRIEF DESCRIPTION OF THE DRAWINGS

Embodiments are illustrated by way of example and are not limited in the accompanying figures.

FIG. 1 includes an illustration of a composite film according to certain embodiments of the present disclosure.

FIG. 2 includes an illustration of a composite film according to certain embodiments of the present disclosure.

FIG. 3 includes an illustration of a composite film according to certain embodiments of the present disclosure.

Figure 4:
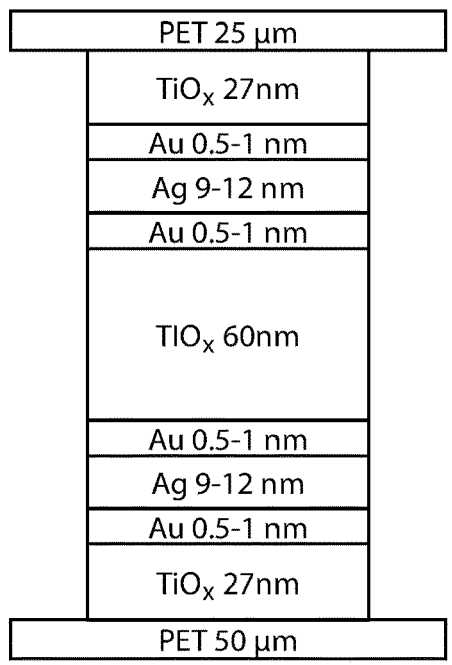
FIG. 4 includes an illustration of a composite film according to certain embodiments of the present disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the optical film arts.

The present disclosure is directed to improved IR-reflecting composite films demonstrating, for example, a synergistic improvement in solar properties, optical properties, and production speed. For example, certain embodiments demonstrate a combined synergistic effect of TSER and VLT. Moreover, the composite can exhibit an improved deposition rate without sacrificing, and even improving optical and solar performance. The concepts are better understood in view of the embodiments described below that illustrate and do not limit the scope of the present invention FIG. 1 illustrates a representative cross section of a composite film 10 according to certain embodiments. The composite film 10 can include a substrate layer 20, one or more metal based layers 30, 32, 34, 36; one more silver based layers 40, 42; one or more metal oxide based composite layers 25, 26, 27; and a counter substrate layer 22. It is to be understood that the composite film 10 illustrated in FIG. 1 is an illustrative embodiment. All of the layers shown are not required, and any number of additional layers, or less layers than shown is within the scope of the present disclosure.

The substrate layer 20 and/or counter substrate layer 22 can be composed of any number of different materials. In certain embodiments, the substrate layer 20 and/or counter substrate layer 22 can be a transparent layer. The substrate layer 20 and/or counter substrate layer 22 can also be flexible. Suitable transparent materials include polycarbonate, polyacrylate, polyester, such as, polyethylene terephthalate (PET), cellulose triacetated (TCA or TAC), polyurethane, fluoropolymers, glass, or combinations thereof. In particular embodiments, the substrate layer 20 and/or counter substrate layer 22 can contain polyethylene terephthalate (PET).

The thickness of the substrate can depend on the material selected and the desired application. In certain embodiments, the substrate layer 20 and/or counter substrate layer 22 can have a thickness of at least about 0.1 micrometer, at least about 1 micrometer, or even at least about 10 micrometers. In further embodiments, the substrate layer 20 and/or counter substrate layer 22 can have a thickness of no greater than about 1000 micrometers, no greater than about 500 micrometers, no greater than about 100 micrometers, or even no greater than about 50 micrometers. Moreover, the substrate layer 20 and/or counter substrate layer 22 can have a thickness in a range of any of the maximum and minimum values described above, such as, from about 0.1 micrometers to about 1000 micrometers, from about 1 micrometer to about 100 micrometers, or even, from about 10 micrometers to about 50 micrometers. In other embodiments, when a rigid substrate is incorporated, such as glass, the substrate layer 20 can have a greater thickness, such as from 1 millimeter to 50 millimeters, or even 1 millimeter to 20 millimeters, or even 1 to 10 millimeters. In very particular embodiments, the thickness of the substrate layer 20 can be greater than the thickness of the counter substrate 22. For example, in very particular embodiments, a ratio of the thickness of the substrate layer 20 to the thickness of the counter substrate 22 can be at least 1, at least 1.5, at least 1.75, or even at least 2.

When used as a composite film for application to a rigid surface, such as a window, the substrate layer 20 can be adapted to be disposed adjacent a surface to be covered with the film. For example, when attached to, for example, a window (not shown), the substrate layer 20 can be nearer the window than a silver based layer. Moreover, as will be discussed in more detail below, an adhesive layer can be disposed adjacent the substrate layer 20 and adapted to contact the window or other surface to be covered with the composite. As such, the composite film described above can be free-standing and adapted to adhere to a transparent panel in, for example, an architectural member or automotive member such as a window.

As discussed above, the composite can contain one or more metal based layers 30, 32, 34, 36. A thin metal based layer can provide increased stability and durability of the silver containing layers and avoid intermixing at the interface of the silver based layers and the metal oxide based layer(s). In certain embodiments, there can be only one metal based layer. In other embodiments, the composite can contain a multitude of metal based layers. Generally, the metal based layers may be disposed directly adjacent one or both major surfaces of a silver based layer. Accordingly, when more than one silver based layer is present, a metal based layer can be disposed on every available major surface of any silver based layer.

Referring again to FIG. 1, in particular embodiments of the present disclosure, a composite can contain a first metal based layer 30 and a second metal based layer 32 directly contacting opposing major surfaces of a first silver based layer 40. As further illustrated in FIG. 1, the composite can additionally contain a third metal based layer 34 and a fourth metal based layer 36 directly contacting opposing major surface of the second silver based layer 42.

Any of the one or more metal based layers described herein can consist essentially of a metal. As used herein, the phrase "consisting essentially of a metal" refers to at least 95 wt. % of a metal. Moreover, in particular embodiments, any of the one or more metal based layers described herein can contain an essentially pure metal or in other embodiments, a metal alloy. As used herein, "essentially pure metal" refers to a metal having and possible impurities in an amount of less than about 5 wt. %. In other embodiments, any of the one or more metal based layers can contain a metal alloy, such as for example containing a predominant metal in a concentration of at least about 70 wt. %, and a minor metal in a concentration of less than about 30% by weight based on the total weight of the metal based layer.

Any of the one or more metal based layers described herein can contain a metal selected including gold, titanium, aluminum, platinum, palladium, copper, indium, zinc or combinations thereof. In particular embodiment the at least one, more than one, or even all, of the metal based layers adjacent a silver based layer can contain or even consist essentially of gold.

Any of the one or more metal based layers described above can have a thickness that enables the metal based layers to be substantially transparent and provide sufficient protection to the silver based layer. For example, any of the one or more metal based layers described above can have a thickness of at least about 0.1 nanometers, or even at least about 0.3 nanometers. Further, any of the one or more metal based layers described above can have a thickness of no greater than about 50 nanometers, no greater than about 5 nanometers, no greater than about 2 nanometers, or even no greater than about 1.5 nanometers. Moreover, any of the one or more metal based layers described above can have a thickness in a range of any of the maximum and minimum values described above, such as, from about 0.1 nanometers to about 5 nanometers, or even from about 0.3 nanometers to about 1.5 nanometers.

Any of the one or more metal based layers described above can have the same thicknesses or can have a different thickness. In particular embodiments, each of the one or more metal layers have the substantially the same thickness. As used herein, "substantially the same thickness" refers to a thicknesses that are within 20% of the average of two compared thicknesses.

Any of the one or more metal based layer(s) can be formed by a vacuum deposition technique, for example, by sputtering or evaporation.

The composites according to the disclosure can contain one or more silver based layers 40, 42. The silver based layer can provide the composite with the ability to reflect infra-red radiation. In particular embodiments, for example, as illustrated, in FIG. 1 the composite can contain a first silver based layer 40. As illustrated, the first silver based layer 40 can directly contact one or more metal based layers, such as a first metal based layer 30 and second metal based layer 50.

Further, in certain embodiments, the composite can contain additional silver based layers, such as a second silver based layer 42. When present, each additional silver based layer can have a metal based layer that directly contacts the major surfaces of the additional silver based layer. For example, as illustrated in FIG. 1, the second silver based layer 42 can be in direct contact with a third metal based layer 34 and a fourth metal based layer 36. Further, the second silver based layer 42 can be further from the substrate than the first silver based layer 40.

Any of the one or more silver based layers described above can contain silver, and in particular embodiments can consist essentially of silver. As used herein, the phrase "consist essentially of silver" refers to a silver based layer containing at least about 95% silver. In other embodiments, the one or more silver based layer can have no greater than about 30 wt. %, no greater than about 20 wt. %, or even no greater than about 10 wt. % of another metal, such as, gold, platinum, palladium, copper, aluminum, indium, zinc, or combinations thereof.

Any of the one or more silver based layer(s) can have a thickness of at least about 0.1 nanometers, at least about 0.5 nanometers, or even at least about 1 nanometer. Furthermore, any of the one or more silver based layer 40 can have a thickness of no greater than about 100 nanometers, no greater than about 50 nanometers, no greater than about 25 nanometers, or even no greater than about 20 nanometers. Moreover, any of the one or more silver based layer 40 can have a thickness in a range of any of the maximum and minimum values described above, such as from about 0.5 nanometers to about 25 nanometers, or even from about 1 nanometer to about 20 nanometers.

In particular embodiments, the second silver based layer 42 can have a greater thickness than the first silver based layer 40. For example, a ratio of the thickness of the second silver based layer 42 to the thickness of the first silver based layer 40 can be at least about 1, at least about 1.5, at least about 2, or even at least about 3.

In particular embodiments, the composite film 10 can contain no more than 3 silver based layers, no more than 2 silver based layers, or even no more than 1 silver based layer. In very particular embodiments, the composite film 10 can contain no more than 2 silver based layers. It is a particular advantage of certain embodiments of the present disclosure to achieve the properties described herein with no more than 2 silver based layers.

The silver based layer(s) can be formed by a vacuum deposition technique, for example, by sputtering or evaporation. In particular embodiments, the silver based layer(s) can be formed by a magnetron sputtering technique.

According to various embodiments of the disclosure, the composite can further contain one or more metal oxide based composite layers 25, 26, 27. A metal oxide based composite layer can be disposed adjacent to, or even, directly contacting a major surface of a metal based layer opposite the silver based layer and/or disposed adjacent to, or even, directly contacting a major surface of a substrate or counter substrate layer.

Any of the one or more metal oxide composite based layer(s) discussed above can contain at least one, at least two, or even at least three separate and distinct layers of various metal oxides including aluminum oxide, titanium oxide, niobium oxide, $BiO_2$, PbO, zinc oxide, AZO, MgZnO, MgO, $MoO_3$, or combinations thereof.

The various metal oxides listed above can also be described in terms of their refractive index. For example, titanium oxide mainly composed of rutile phase has a refractive index of about 2.41 at 510 nm, $BiO_2$ has a refractive index of about 2.45 at 550 nanometers, and PbO has a refractive index of about 2.55 at 550 nanometers, $Nb_2O_5$ has a refractive index of about 2.4 at 550 nanometers, and ZnO has a refractive index of about 2.0 at 550 nanometers. Accordingly, in very particular embodiments, at least one of the metal oxides used as a layer in the one or more metal oxide based composite layer(s) can have a high refractive index. For example, at least one of the metal oxides can have a refractive index of at least about 2.3, at least about 2.4, at least about 2.5 at either 510 nanometers or at 550 nanometers. Furthermore, at least one of the metal oxides used as a layer in the one or more metal oxide based composite layer(s) can have a low refractive index. For example, at least one of the metal oxides can have a refractive index of no greater than about 2.4, less than about 2.3, such as less than about 2.2, less than about 2.1, or even less than about 2.0. Moreover, a metal oxide based composite layer can have at least one layer based on a high refractive index material, and at least one layer having a low refractive index material. For example, a metal oxide based composite layer can have at least one layer based on a metal oxide having a refractive index of at least 2.4, and a metal oxide having a refractive index of less than 2.4.

The various metal oxides described above can also be described in terms of their deposition rate with one rotative ceramic target. For example, titanium oxide can have a deposition rate of 1.5 $nm \cdot m^2 \cdot min^{-1} \cdot kW^{-1}$, niobium oxide can have a deposition rate of 3 $nm \cdot m^2 \cdot min^{-1} \cdot kW^{-1}$, and AZO can have a deposition rate of 7 $nm \cdot m^2 \cdot min^{-1} \cdot kW^{-1}$.

Accordingly, in very particular embodiments, at least one of the metal oxides used as a layer in the one or more metal oxide based composite layer(s) can have a high deposition rate. For example, in certain embodiments, at least one of the metal oxides can have a deposition rate of at least 1, at least 1.5, at least 2 nm·m$^{2}$·min$^{-1}$·kW$^{-1}$, at least 3 nm·m$^{2}$·min$^{-1}$·kW$^{-1}$, at least 4 nm·m$^{2}$·min$^{-1}$·kW$^{-1}$, at least 5, at least 6 nm·m$^{2}$·min$^{-1}$·kW$^{-1}$, or even at least 7 nm·m$^{2}$·min$^{-1}$·kW$^{-1}$. Furthermore, at least one of the metal oxides can have a deposition rate of no greater than 50, or even no greater than 25 nm·m$^{2}$·min$^{-1}$·kW$^{-1}$, no greater than 8 nm·m$^{2}$·min$^{-1}$·kW$^{-1}$, no greater than 4 nm·m$^{2}$·min$^{-1}$·kW$^{-1}$, or even no greater than 2 nm·m$^{2}$·min$^{-1}$·kW$^{-1}$. Moreover, at least one of the metal oxides can have a deposition rate in a range of any of the minimum and maximum values provided above, such as in a range of 1 nm·m$^{2}$·min$^{-1}$·kW$^{-1}$ to 50 nm·m$^{2}$·min$^{-1}$·kW$^{-1}$, or even in a range of 1.5 nm·m$^{2}$·min$^{-1}$·kW$^{-1}$ to 25 nm·m$^{2}$·min$^{-1}$·kW$^{-1}$. In very particular embodiments, at least two of the metal oxides used as a layer in the one or more metal oxide based composite layer(s) can have different deposition rates. For example, one of the metal oxides used as a layer in the one or more metal oxide based composite layer(s) can have a deposition rate of at least about 3 nm·m$^{2}$·min$^{-1}$·kW$^{-1}$, while another metal oxide used as a layer in the same metal oxide based composite layer can have a deposition rate of no greater than 3 nm·m$^{2}$·min$^{-1}$·kW$^{-1}$. It is to be understood that any two or even three different metal oxides used in a metal oxide based composite layer can have any of the deposition rates provided above in any combination.

A particular advantage of certain embodiments of the present disclosure is the use of metal oxides which have high deposition rates. Traditionally, such metal oxide layers were not used because of, for example, poor optical properties, IR properties, and others. However, the present inventors have surprisingly discovered the ability to use metal oxides having high deposition rates without sacrificing key optical and IR properties.

Referring now to FIG. 2, in certain embodiments, the metal oxide based composite layer can contain a layer 101, 103 adapted to improve the quality of the metal based layer and/or the silver based layer. For example, the layer 101, 103 can contain an oxide material such as a metal oxide material. In particular embodiments, the metal oxide material can contain a zinc oxide, for example AZO or MgZnO. In very particular embodiments, the zinc oxide can be AZO. In other embodiments, the layer 101, 103 can contain an oxide material such as MgO or MoO$_3$.

A particular advantage of certain embodiments of the present disclosure is the discovery that particular metal oxide based layers, such as the layer 101, 103 in a metal oxide composite based layer 25, 26 can improve the uniformity of the metal based layer and therefore improve the optical properties of the immediately thereafter deposited metal based layer and the optical properties of the stack as a whole. Without wishing to be bound by theory, the improvement in the uniformity of the metal based layer can be at least partly attributed to a heteroepitaxy effect.

For example, in certain embodiments, an improvement in the composite's performance can occur when the crystal structure of a metal oxide based layer (within a metal oxide composite based layer) matches or closely matches the crystal structure of an adjacent, subsequently deposited, metal based layer. The crystal structure of a material (the arrangement of atoms within a given type of crystal) can be described in terms of its simplest repeating unit, referred to as a unit cell, having unit-cell-edge lengths a, b, and c, referred to as lattice parameters. To quantify the degree of crystal structure match, the crystal structure of the first layer closely matches the crystal structure of the second layer when the lattice parameters a of the first layer ($a_1$) and the second layer ($a_2$) satisfy the following formula:

$$([sqrt(2)/2]*a_2)/a_1 = x,$$

where x represents a value of no less than 0.65. In particular embodiments described herein, such as between a metal oxide based layer and a metal layer and/or a silver layer, x represents a value of no less than 0.70, no less than 0.75, no less than 0.80, no less than 0.82, no less than 0.84, or no less than 0.86. In further particular embodiments, x represents a value of no greater than 1.5, no greater than 1.4, no greater than 1.3, no greater than 1.2, no greater than 1.1, or no greater than 1.0. Moreover, x can represent a value in a range of any of the above minimum and maximum values described above, such as in a range of from 0.75 to 1.4, from 0.84 to 1.2, or even from 0.86 to 1.0.

For example, the crystal structure of gold is face centered cubic (fcc) and its lattice parameter a is 0.408 nm. Because the crystal structure of gold is cubic, it can have only one lattice parameter. Under ambient conditions, ZnO mainly crystallizes under wurtzite form. Lattice parameters for ZnO in wurtzite form are a=0.325 nm and c=0.520 nm. When this form is oriented in the so-called (002) orientation, the surface can have atom distances similar to that of gold when the gold crystal is oriented in the so called (111) orientation. That is, $([sqrt(2)/2] \times a_{Au}) \sim a_{ZnO}$, which corresponds to 0.29 nm~0.33 nm. The effect with AZO (=ZnO:Al) can be similar, even when Al atoms are intercalated in the network.

On the other hand, if Au is deposited on a different metal oxide based layer, such as TiOx, the heteroepitaxy effect is not effective since the mismatch between crystal structures is high. For example, when TiOx is deposited by magnetron sputtering without thermal treatment, the material can be amorphous (in this case there is no specific order) or can have a rutile crystal structure. A rutile crystal structure has a body-centered tetragonal unit cell with a=b=0.458 nm and c=0.295 nm. In certain embodiments, from this structure, TiOx does not appear to have a crystal structure that closely matches the crystal structure of an Au unit cell, regardless of orientation. Accordingly, in very particular embodiments, the metal oxide layer directly adjacent a metal based layer can be essentially free of titanium oxide.

In very particular embodiments, metal oxide based layer directly adjacent a metal based layer can be AZO. In even further very particular embodiments, the metal based layer adjacent the metal oxide based layer can be gold.

It is to be understood that when using a metal oxide based layer directly adjacent a metal based layer as described above is used, the silver based layer deposited directly after a metal based layer would also improve. Accordingly, the same degree of lattice parameter matching described above can be present between a metal oxide based layer and a silver based layer, where a metal based layer is disposed between the metal oxide based layer and the silver based layer.

Referring again to FIG. 2, in certain embodiments, the composite film 10 can contain at least one or even at least two metal oxide based composite layers 25, 26 that each contain a layer 101, 103 adapted to improve the quality of the metal based layer and/or the silver based layer.

The layer 101, 103 can be disposed within a metal oxide based composite layer 25, 26 such that it is directly adjacent to and contacting a metal based layer 30, 34. Within the metal oxide based composite layer 25, 26, the other metal oxide layer(s) 102, 104 (other than the layer 101, 103) can include, for example, aluminum oxide, titanium oxide, niobium oxide, $BiO_2$, PbO, or combinations thereof. In very particular embodiments, the metal oxide based composite layer 25, 26 can contain a titanium oxide based layer 102, 104 in addition to layer 101, 103. In other particular embodiments, the metal oxide based composite layer 25, 26 can contain a niobium oxide based layer 102, 104 in addition to layer 101, 103, as will be described in more detail below.

When a layer 101, 103 adapted to improve the quality of the metal based layer and/or the silver based layer is present in a metal oxide based composite layer 25, 26, the layer 101, 103 can have a low thickness. For example the layer 101, 103 can have a thickness of no greater than 50 nanometers, no greater than 40 nanometers, no greater than 30 nanometers, no greater than 20 nanometers, no greater than 10 nanometers, or even no greater than 7 nanometers. Furthermore, the layer 101, 103 can have a thickness of at least 1 nanometer, at least 2 nanometers, or even at least 3 nanometers. Moreover, the layer 101, 103 can have a thickness in a range of any of the minimum and maximum values provided above, such as in a range of 1 to 20 nanometers, or even in a range of 2 to 10 nanometers. Moreover, in certain embodiments, when layer 101, 103 is present in a metal oxide based composite layer 25, 26, the layer 101, 103 can have a thickness which is less than the thickness of the remainder of the metal oxide based composite layer 25, 26. For example, when layer 101, 103 is present in a metal oxide based composite layer 25, 26, a ratio of the thickness of the layer 101, 103 to the thickness of the remainder of the metal oxide based composite layer 102, 104 can be less than 1, such as no greater than 0.8, no greater than 0.7, no greater than 0.6, no greater than 0.5, no greater than 0.3, no greater than 0.2, or even no greater than about 0.15. Furthermore, when layer 101, 103 is present in a metal oxide based composite layer 25, 26, a ratio of the thickness of the layer 101, 103 to the thickness of the remainder of the metal oxide based composite layer 102, 104 can be at least 0.01, at least 0.05, or even at least 0.075.

Yet another particular advantage of certain embodiments of the present disclosure is a metal oxide composite based layer 25, 26, 27 containing a combination of a layer 101, 103 adapted to improve the quality of the metal based layer and/or the silver based layer, and a niobium oxide layer. As discussed in more detail herein, the use of niobium oxide has not been preferred over the use of titanium oxide, due in part to niobium oxide's lower refractive index. However, the current inventors surprisingly discovered that by using a layer 101, 103 in combination with a layer having a high deposition rate, such as niobium oxide, the composite film 10 exhibited a significant and synergistic improvement in optical and solar properties, while also realizing significant improvements in production speed, or line speed as will be illustrated in more detail in the Examples below.

Referring now to FIG. 3, yet another particular advantage of certain embodiments of the present disclosure is a metal oxide composite based layer 25, 26, 27 containing a combination of a titanium oxide based layer 110, 111, 112 and a niobium oxide based layer 113, 114, 115, 116. As discussed in more detail herein, the use of niobium oxide has not been preferred over the use of titanium oxide, due in part to niobium oxide's lower refractive index. However, the current inventors surprisingly discovered that by using a titanium oxide layer in combination with a niobium oxide layer, the composite film can exhibit a significant and synergistic improvement in optical and solar properties, while also realizing significant improvements in production speed, or line speed. Without wishing to be bound by theory, it is believed that the by having a titanium oxide layer present, particularly directly adjacent to and contacting the substrate layer can provide a better refractive index match and therefore improved optical properties, and that the use of a niobium oxide based layer does not significantly hinder the improvement realized by the addition of the titanium oxide based layers.

In such embodiments that incorporate a metal oxide based composite layer 25, 26, 27 including a titanium oxide based layer 110, 111, 112 and a niobium oxide based layer 113, 114, 115, 116, the titanium oxide based layer 110, 111, 112 can have a thickness that is less than the thickness of the niobium oxide based layer 113, 114, 115, 116 within a metal oxide based composite layer 25, 26, 27. For example, a ratio of the thickness of the niobium oxide based layer 113, 114, 115, 116 to the thickness of the titanium oxide based layer 110, 111, 112 can be greater than 1, such as no less than 1.5, no less than 2, or even no less than 2.5. In further embodiments, a ratio of the thickness of the niobium oxide based layer 113, 114, 115, 116 to the thickness of the titanium oxide based layer 110, 111, 112 can be no greater than 10, no greater than 6, or even no greater than 5. Moreover, a ratio of the thickness of the niobium oxide based layer 113, 114, 115, 116 to the thickness of the titanium oxide based layer 110, 111, 112 can be within a range of any of the minimum and maximum values provided above, such as in a range of 1.5 to 10 or even 2.5 to 5.

In even more particular embodiments, in a metal oxide based composite layer including a titanium oxide based layer and a niobium oxide based layer, the titanium oxide based layer can have a thickness of at least 1 nanometer, at least 2 nanometers, or even at least 3 nanometers. In other embodiments, the titanium oxide based layer can have a thickness of no greater than 30 nanometers, no greater than 20 nanometers, or even no greater than 10 nanometers. Moreover, the titanium oxide based layer can have a thickness in range of any of the minimum and maximum thicknesses provided above, such as in a range of 1 to 50 nanometers, or even 3 to 20 nanometers. Moreover, in a metal oxide based composite layer including a titanium oxide based layer and a niobium oxide based layer, the niobium oxide layer can have a thickness of at least 1 nanometer, at least 5 nanometers, at least 10 nanometers, or even at least 15 nanometers. In further embodiments, the niobium oxide based layer can have a thickness of no greater than 70 nanometers, no greater than 60 nanometers, no greater than 50 nanometers, or even no greater than 40 nanometers. Moreover, the titanium oxide based layer can have a thickness in range of any of the minimum and maximum thicknesses provided above, such as in a range of 5 to 60 nanometers, or even 10 to 50 nanometers.

In total, any of the one or more metal oxide based composite layer(s) 25, 26, 27 discussed above can have a thickness of at least about 1 nanometer, at least about 2 nanometers, or even at least about 5 nanometers. Further, any of the one or more metal oxide based composite layer(s) 25, 26, 27 discussed above can have a thickness of no greater than about 100 nanometers, no greater than about 80 nanometers, or even no greater than about 70 nanometers. Moreover, any of the one or more metal oxide based composite layer(s) 25, 26, 27 discussed above can have a thickness in a range of any of the maximum and minimum values described above, such as, from about 1 nanometers to about 100 nanometers, or even from about 2 nanometers to about 60 nanometers.

In particular embodiments, the one or more metal oxide based composite layers 25, 26, 27 can have varying thicknesses. For example, in one particular embodiment, the first metal oxide based composite layer 25, which is disposed nearer the substrate layer 20 than the other metal oxide based composite layers can have a thickness which is less than any other metal oxide based composite layer, such as the second metal oxide based composite layer 26 or the third metal oxide based composite layer 27. In certain embodiments, a ratio of the thickness of the second metal oxide based layer 26 or third metal oxide based layer 27 to the thickness of the first metal oxide based layer 25 can be at least 1, at least 1.5, at least 2, at least 2.5, at least 3, at least 4, at least 5, or even at least 6.

In further embodiments, the composite film 10 can contain at least one metal oxide based composite layer 26 which can contain more niobium oxide based layers 114, 115 than titanium oxide based layers 111.

In even further particular embodiments and as illustrated in FIG. 3, a titanium oxide layer 110, 112 can be disposed directly adjacent the substrate layer 20 and/or counter substrate layer (if present) 22. In other embodiments, a niobium oxide layer can be disposed directly adjacent the substrate layer and/or counter substrate layer (if present). In yet even further particular embodiments, a niobium oxide layer 113, 114, 115, 116 can be disposed directly adjacent the one or more metal based layers 30, 32, 34, 36. In other embodiments, a titanium oxide layer can be disposed directly adjacent the one or more metal based layers.

The one or more individual metal oxide based layer(s) discussed herein and consequently, the metal oxide based composite layer(s) can be formed by a vacuum deposition technique, for example, by sputtering or evaporation, or an atomic layer deposition technique. For example, the metal oxide based layer(s) can be obtained by DC magnetron sputtering using rotatable ceramic metal oxide targets. These targets can have enough electrical conductivity to be used as cathodes in a DC magnetron sputtering process.

The composite 10, as a whole, including all layers disposed between and including the substrate layer and the outermost layer, such as the counter substrate, can have a total thickness of at least about 25 micrometers, at least about 50 micrometers, at least about 60 micrometers, or even at least about 70 micrometers. Further, the entire composite 10 can have a total thickness of no greater than about 300 micrometers, no greater than about 200 micrometers, no greater than about 100 micrometers, or even no greater than about 85 micrometers. Moreover, the entire composite can have a total thickness in a range of any of the maximum and minimum values described above, such as from about 25 micrometers to about 300 micrometers, or even from about 50 micrometers to about 100 micrometers.

Particular advantages of the composite film will now be described in terms of its performance. Parameters include visual light transmittance, total solar energy rejection, light to solar gain ratio, visual light reflectance, abrasion resistance rating, and line speed.

Visual light transmittance refers to the percentage of the visible spectrum (380 to 780 nanometers) that is transmitted through a composite. The visual light transmittance can be measured according to ISO 9050. A particular advantage of the present disclosure is the ability to obtain the visual light transmittance values described herein and illustrated in the Examples below, especially in combination with the other parameters described herein. In embodiments of the present disclosure, the composite can have a visual light transmittance of at least about 60%, at least about 65%, or even at least about 70%. Further, the composite can have a visual light transmittance of no greater than 100%, no greater than 95%, or even no greater than 90%. Moreover, the composite can have a visual light transmittance in a range of any of the maximum and minimum values described above, such as in the range of from about 60% to about 100%, or even from about 70% to about 100%.

Total Solar Energy Rejection is a measurement of the total energy rejected by a glazing which is the sum of the solar direct reflectance and the secondary heat transfer rejection factor towards the outside, the latter resulting from heat transfer by convection and longwave IR-radiation of that part of the incident solar radiation which has been absorbed by the composite. The total solar energy rejection can be measured according to standard ISO 9050. A particular advantage of the present disclosure is the ability to obtain the total solar energy rejection values described herein and illustrated in the Examples below, especially in combination with the other parameters described herein. In particular embodiments of the present disclosure, the composite can have a total solar energy rejection of at least about 50%, at least about 52%, at least about 55%, or even at least about 59%. Further, the composite can have a total solar energy rejection of no greater than about 90%, no greater than about 80%, or even no greater than about 70%. Moreover, the composite can have a total solar energy rejection in a range of any of the maximum and minimum values described above, such as from about 50% to about 90%, or even from about 59% to about 90%.

The light to solar heat gain ratio refers to a gauge of the relative efficiency of different composite types in transmitting daylight while blocking heat gains. The higher the ratio, the brighter the room is without adding excessive amounts of heat. The light to solar heat gain ratio can be determined by the following equation:

$$LSHGR=(VLT)/(1-TSER)$$

where VLT is the visual light transmittance determined above. A particular advantage of the present disclosure is the ability to obtain the light to solar heat gain ratio values described herein and illustrated in the Examples below, especially in combination with the other parameters described herein. In particular embodiments of the present disclosure, the composite can have a light to solar gain ratio at least about 1.5, at least about 1.60, at least about 1.70, or even at least about 1.80. Further, the composite can have a light to solar gain ratio of no greater than 1.95, no greater than 1.92, or even no greater than 1.90. Moreover, the composite can have a light to solar heat gain ratio in a range of any of the maximum and minimum values described above, such as from about 1.60 to about 1.95, or even 1.80 to about 1.90.

The visual light reflectance is a measurement of total visible reflected light by a film. The visual light reflectance can be measured according to ISO 9050. A particular advantage of the present disclosure is the ability to obtain the visual light reflectance values described herein and illustrated in the Examples below, especially in combination with the other parameters described herein. In particular embodiments of the present disclosure, the composite can have a visual light reflectance of at least about 0.5%, at least about 1%, or even at least about 2%. Further, the composite can have a visual light reflectance of no greater than about 12%, no greater than about 10%, no greater than about 8%, or even no greater than about 6%. Moreover, the composite can have a visual light reflectance in a range of any of the maximum and minimum values described above, such as in the range of from about 0.5% to about 12% or even from about 2% to about 6%.

The present disclosure represents a departure from the state of the art. For example, the IR-reflecting film composite films described above can demonstrate a synergistic improvement in the combination of TSER and VLT and thus improved selectivity, also known as the light to solar heat gain ratio (LSHGR). In certain embodiments of this disclosure, the present inventors surprisingly discovered that by incorporating a niobium oxide based dielectric layer in combination with a metal oxide layer such as a zinc oxide based layer, the film composite surprisingly exhibited a synergistic increase in the TSER and VLT. In practice titanium oxide dielectric were used to provide a high VLT, however use of titanium oxide is limited by its deposition rate and thus more costly to manufacture. Further, while use of niobium oxide alone improves the TSER, it diminishes the VLT in comparison to titanium oxide. Without wishing to be bound by theory, it is believed that formation of a zinc oxide layer beneath the silver layer induces a better crystallization of the silver layer, resulting in an improved VLT. It was then realized that the combination of niobium oxide layer and a zinc oxide layer synergistically improved the TSER and improved or maintained the VLT resulting in a significantly improved selectivity than has been achievable. Still further, it was discovered that the overall line speed to form the composite film can be improved by use of high deposition rate materials, such as niobium oxide, without sacrificing the optical and solar properties of the composite film.

EXAMPLES

Sample A contains a film stack as outlined in FIG. 4. This film stack is commercially available as LX70 under the tradename SOLMOX and is obtainable from SolarGard Corporation.

Figure 5:
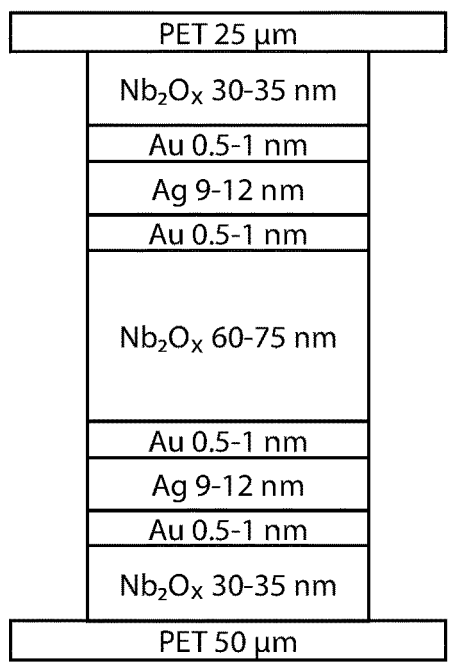
FIG. 5 includes an illustration of a composite film according to certain embodiments of the present disclosure.
Figure 6:
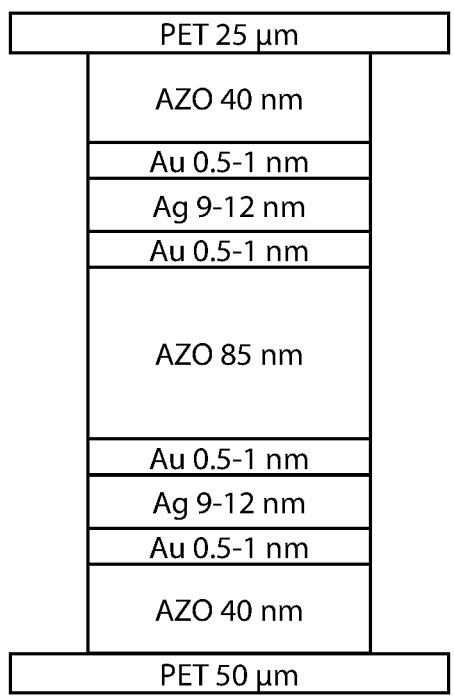
FIG. 6 includes an illustration of a composite film according to certain embodiments of the present disclosure.

Sample B contains the same film stack outlined in FIG. 5, which differs from the film stack of Sample A in that the titanium oxide layers are replaced with niobium oxide layers. Sample C contains the same film stack outlined in FIG. 6, which differs from the film stack of Sample A in that the titanium oxide layers are replaced with AZO layers.

Figure 7:
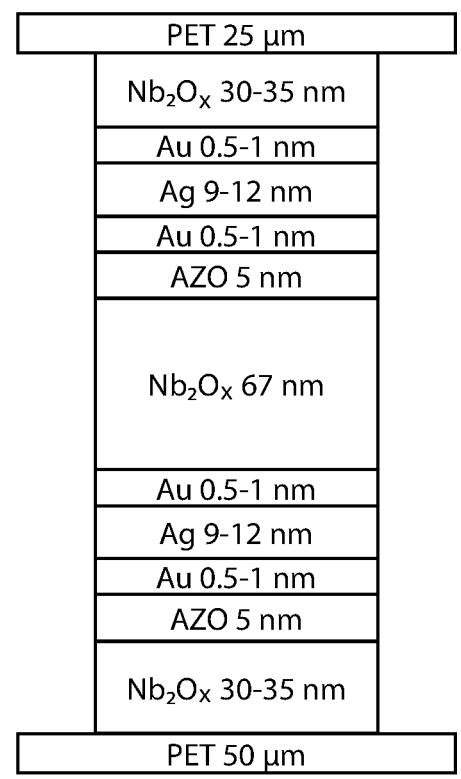
FIG. 7 includes an illustration of a composite film according to certain embodiments of the present disclosure.

Sample D contains the same film stack outlined in FIG. 7, which differs from the film stack of Sample A in that the titanium dioxide layers are replaced with a metal oxide based composite layer including a niobium oxide layer and an AZO layer.

Figure 8:
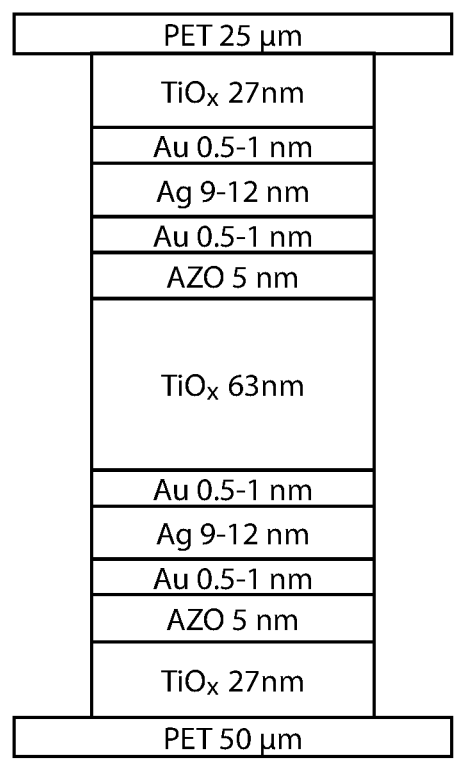
FIG. 8 includes an illustration of a composite film according to certain embodiments of the present disclosure.

Sample E contains the same film stack outlined in FIG. 8, which differs from the film stack of Sample A in that the titanium dioxide layers are replaced with a metal oxide based composite layer including a titanium oxide layer and an AZO layer.

Figure 9:
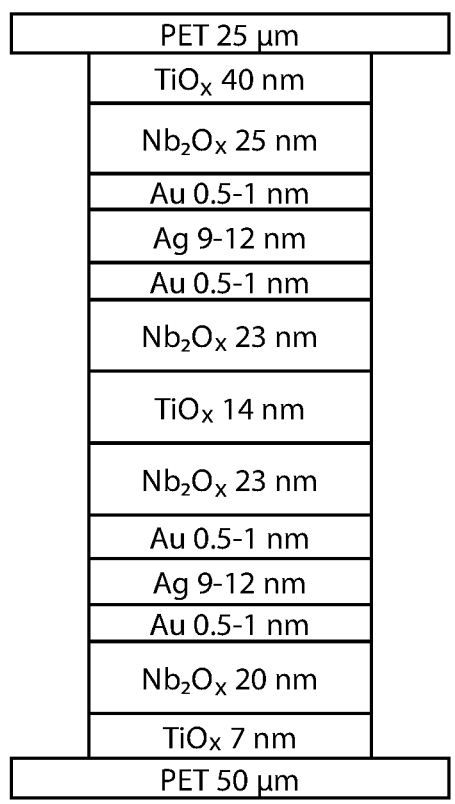
FIG. 9 includes an illustration of a composite film according to certain embodiments of the present disclosure.

Sample F contains the film stack outlined in FIG. 9, which differs from the film stack of Sample A in that the titanium dioxide layers are replaced with a metal oxide based composite layer including a titanium oxide layer and a niobium oxide layer.

Figure 10:
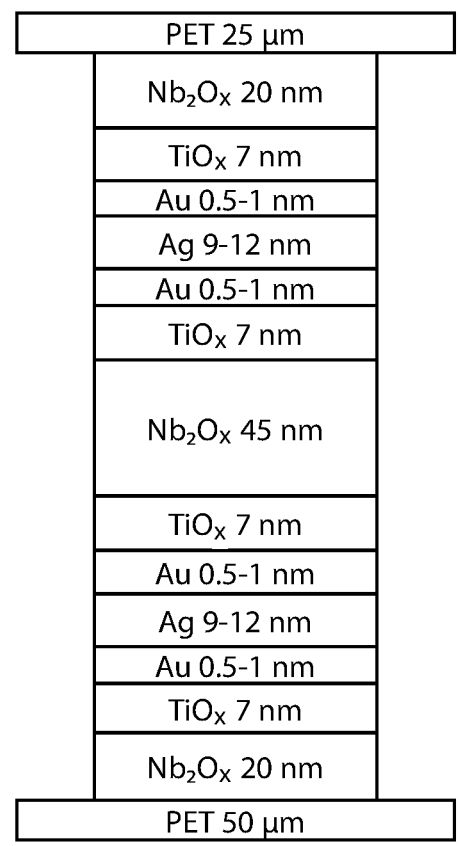
FIG. 10 includes an illustration of a composite film according to certain embodiments of the present disclosure.

Sample G contains the film stack outline in FIG. 10, which differs from the film stack of Sample F in that the order of the titanium oxide layer and niobium oxide layers are switched.

For each of the films, the layers are deposited by roll-to-roll (R2R) magnetron deposition with ceramic rotative targets for oxide materials. A small amount of oxygen is necessary to adjust the transparency of $TiO_x$ and $Nb_2O_x$.

The samples are then tested for the properties in the context of a solar film, and the results are reported below in Table 1.

TABLE 1

| Property | Sample A | Sample B | Sample C | Sample D | Sample E | Sample F | Sample G |
|---|---|---|---|---|---|---|---|
| Visual Light Transmittance (VLT) | 72% | 70% | 64.5% | 72% | 74% | 72% | 72% |
| Total Solar Energy Rejection (TSER) | 55% | 55% | 63.0% | 56% | 56% | 55% | 55% |
| Light to Solar Heat Gain Ratio | 1.60 | 1.55 | 1.74 | 1.63 | 1.68 | 1.60 | 1.60 |
| Visual Light Reflectance | 11 | 9.4 | 12.6 | 9.4 | 11.4 | 10.5 | 10.4 |

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A composite film comprising a metal oxide based composite layer comprising a niobium oxide layer and a metal oxide layer adapted to improve the uniformity of a metal based layer, and wherein the composite film comprises a silver based layer, wherein the composite film has a visual light transmittance of at least 65%.

Item 2. A composite film comprising a metal oxide based composite layer, wherein the metal oxide based composite layer comprises at least two distinct layers of different metal oxides.

Item 3. A composite film comprising:
  a. a transparent substrate layer comprising a polymer;
  b. one or more metal based layers;
  c. one or more silver based layers;
  d. one or more metal oxide based composite layers, wherein the one or more metal oxide based composite layers comprises at least two distinct layers of different metal oxides; and
  wherein the composite film has a visual light transmittance of at least 65%.

Item 4. A composite film having no greater than two silver based layers, a Total Solar Energy Rejection (TSER) of greater than 55%, and a Visual Light Transmittance (VLT) of at least 70%.

Item 5. A composite film having no greater than two silver based layers, and a Light to Solar Heat Gain Ratio of at least 1.6.

Item 6. A composite film comprising a metal oxide based layer having a sputtering deposition rate of greater than 1.5 nm·m$^2$·min$^{-1}$·kW$^{-1}$ on a single rotative ceramic target, and wherein the composite film has a Light to Solar Heat Gain Ratio of at least 1.6.

Item 7. A composite film comprising:
a. a substrate layer;
b. a metal oxide based composite layer comprising at least a first metal oxide based layer and a second metal oxide based layer and
c. a metal based layer adjacent the second metal oxide based layer; and
d. a silver based layer adjacent the metal based layer
wherein the second metal oxide based layer comprises a metal oxide having a lattice parameter $a_1$; and wherein the metal based layer comprises a metal having a lattice parameter $a_2$, or wherein the silver based layer comprises a silver based compound having a lattice parameter $a_2$; and wherein $a_1$ and $a_2$ satisfy the following formula:

$$([sqrt(2)/2]*a_2)/a_1=x,$$

where x represents a value of no less than 0.65.

Item 8. A method of forming a composite film comprising:
a. providing a transparent substrate layer comprising a polymer;
b. forming one or more metal oxide based layers by sputtering;
c. forming one or more metal based layers;
d. forming one or more silver based layers;
e. wherein, forming the one or more metal oxide based layers by sputtering has a deposition rate of greater than 1.5 nm·m$^2$·min$^{-1}$·kW$^{-1}$ on a single rotative ceramic target.

Item 9. The composite or method of any one of the preceding items comprising a transparent substrate layer comprising a polymer.

Item 10. The composite or method of any one of the preceding items, wherein the transparent substrate layer comprises polycarbonate, polyacrylate, polyester, cellulose triacetated (TCA or TAC), polyurethane, or combinations thereof.

Item 11. The composite or method of any one of the preceding items, wherein the transparent substrate layer comprises polyethylene terephthalate (PET).

Item 12. The composite or method of any one of the preceding items, wherein the transparent substrate layer has a thickness of at least about 0.1 micrometers, at least about 1 micrometer, or even at least about 10 micrometers; a thickness of no greater than about 1000 micrometers, no greater than about 500 micrometers, no greater than about 100 micrometers, or even no greater than about 50 micrometers; or a thickness in a range of about 0.1 micrometers to about 1000 micrometers or even in a range of about 10 micrometers to about 50 micrometers.

Item 13. The composite or method of any one of the preceding items further comprising a transparent counter substrate.

Item 14. The composite or method of any one of the preceding items further comprising a counter substrate as an outermost layer of the composite such that at least the one or more silver based layers, the one or more metal oxide based layers, and the one or more silver based layers are sandwiched between the substrate layer and the counter substrate layer.

Item 15. The composite or method of any one of the preceding items, wherein the transparent counter substrate layer comprises polycarbonate, polyacrylate, polyester, cellulose triacetated (TCA or TAC), polyurethane, or combinations thereof.

Item 16. The composite or method of any one of the preceding items, wherein the transparent counter substrate layer comprises polyethylene terephthalate (PET).

Item 17. The composite or method of any one of the preceding items, wherein the transparent substrate layer has a thickness of at least about 0.1 micrometers, at least about 1 micrometer, or even at least about 10 micrometers; a thickness of no greater than about 1000 micrometers, no greater than about 500 micrometers, no greater than about 100 micrometers, or even no greater than about 50 micrometers; or a thickness in a range of about 0.1 micrometers to about 1000 micrometers or even in a range of about 10 micrometers to about 50 micrometers.

Item 18. The composite or method of any one of the preceding items, wherein the composite comprises one or more metal based layers.

Item 19. The composite or method of any one of the preceding items, wherein the composite comprises a first metal based layer and a second metal based layer, and wherein the first metal based layer and the second metal based layer are in direct contact with one of the one or more silver based layer.

Item 20. The composite or method of any one of the preceding items, wherein the composite comprises a first silver based layer, a second silver based layer, a third metal based layer and a fourth metal based layer, and wherein the third metal based layer and the fourth metal based layer are in direct contact with the second silver based layer.

Item 21. The composite or method of any one of the preceding items, wherein the one or more metal based layers consist essentially of a metal.

Item 22. The composite or method of any one of the preceding items, wherein the one or more metal based layers comprises an essentially pure metal or a metal alloy.

Item 23. The composite or method of any one of the preceding items, wherein the one or more metal based layers comprise a metal selected from the group consisting of gold, titanium, aluminum, platinum, palladium, copper, indium, zinc and combinations thereof.

Item 24. The composite or method of any one of the preceding items, wherein the one or more metal based layers have a thickness of at least about 0.1 nanometers; wherein the layer comprising a metal has a thickness of no greater than about 50 nanometers, no greater than about 5 nanometers, no greater than about 2 nanometers, or even no greater than about 1 nanometers; or wherein the layer comprising a metal has a thickness in a range of about 0.1 nanometers to about 50 nanometers or even in a range of about 0.1 nanometers to about 2 nanometers.

Item 25. The composite or method of any one of the preceding items, wherein the composite comprises comprising one or more silver based layers.

Item 26. The composite or method of any one of the preceding items, wherein the one or more silver based layers comprises a first silver based layer, and a second silver based layer.

Item 27. The composite or method of any one of the preceding items, wherein the one or more silver based layers consists of a first silver based layer, and a second silver based layer.

Item 28. The composite or method of any one of the preceding items, wherein the one or more silver based layers consists of two separate and distinct silver based layers.

Item 29. The composite or method of any one of the preceding items, wherein the one or more silver based layers consists essentially of silver.

Item 30. The composite or method of any one of the preceding items, wherein the one more silver based layers has a thickness of at least about 0.5 nanometers, or even at least about 1 nanometers; a thickness of no greater about 100 nanometers, no greater about 50 nanometers, no greater about 25 nanometers, or even no greater about 20 nanometers; or a thickness in a range of about 0.5 nanometers to about 100 nanometers or even in a range of about 1 nanometers to about 20 nanometers.

Item 31. The composite or method of any one of the preceding items, wherein a combined thickness of all of the one more silver based layers is at least about 0.1 nanometers, at least about 1 nanometer, or even at least about 2 nanometers; a thickness of no greater about 200 nanometers, no greater about 100 nanometers, no greater about 50 nanometers, or even no greater about 40 nanometers, no greater than about 30 nanometers, or even no greater than about 25 nanometers; or a thickness in a range of about 0.1 nanometers to about 100 nanometers or even in a range of about 2 nanometers to about 25 nanometers.

Item 32. The composite or method of any one of the preceding items, wherein the composite comprises one or more metal oxide based composite layers.

Item 33. The composite film or method of any one of the preceding items, wherein the metal oxide based composite layer comprises at least two distinct layers of different metal oxides.

Item 34. The composite film or method of any one of the preceding items, wherein the metal oxide based composite layer comprises at least three distinct layers of different metal oxides.

Item 35. The composite or method of any one of the preceding items, wherein at least one of the one or more metal oxide based composite layers directly contacts a metal based layer.

Item 36. The composite or method of any one of the preceding items, wherein at least one of the one or more metal oxide based layers directly contacts a substrate layer.

Item 37. The composite or method of any one of the preceding items, wherein the composite comprises a first metal oxide based composite layer and a second metal oxide based composite layer.

Item 38. The composite or method of any one of the preceding items, wherein the composite comprises a first metal oxide based composite layer, a second metal oxide based composite layer, and a third metal oxide based composite layer.

Item 39. The composite or method of any one of the preceding items, wherein the one more metal oxide based composite layers comprise a metal oxide based layer comprising aluminum oxide, titanium oxide, $BiO_2$, PbO, niobium oxide, zinc oxide, manganese oxide, molybdenum oxide, or combinations thereof.

Item 40. The composite or method of any one of the preceding items, wherein the one more metal oxide based composite layers comprise a metal oxide layer comprising niobium oxide.

Item 41. The composite or method of any one of the preceding items, wherein the one more metal oxide based composite layers comprise a metal oxide layer comprising zinc oxide.

Item 42. The composite or method of any one of the preceding items, wherein the composite comprises one or more zinc oxide based layers comprising AZO.

Item 43. The composite or method of any one of the preceding items, wherein the one more metal oxide based composite layers comprise a metal oxide layer comprising niobium oxide and a metal oxide layer comprising zinc oxide in the same metal oxide based composite layer.

Item 44. The composite or method of any one of the preceding items, wherein the one more metal oxide based composite layers comprise a metal oxide layer comprising titanium oxide and a metal oxide layer comprising zinc oxide in the same metal oxide based composite layer.

Item 45. The composite or method of any one of the preceding items, wherein the one more metal oxide based composite layers comprise a metal oxide layer comprising niobium oxide and a metal oxide layer comprising titanium oxide in the same metal oxide based composite layer.

Item 46. The composite or method of any one of the preceding items, wherein the one more metal oxide based composite layers comprise a metal oxide layer comprising niobium oxide and a metal oxide layer comprising titanium oxide in the same metal oxide based composite layer, and wherein the thickness of the titanium oxide layer is less than the thickness of the niobium oxide layer in the same metal oxide based composite layer.

Item 47. The composite or method of any one of the preceding items, wherein the one more metal oxide based composite layers comprise a metal oxide layer comprising a zinc oxide and a metal oxide layer comprising titanium oxide or niobium oxide in the same metal oxide based composite layer, and wherein the thickness of the zinc oxide layer is less than the thickness of the niobium oxide or titanium oxide layer in the same metal oxide based composite layer.

Item 48. The composite or method of any one of the preceding items, wherein the one or more metal oxide based composite layers has a thickness of at least about 0.5 nanometers, at least about 1 nanometers, at least about 2 nanometers, or even at least about 20 nanometers; a thickness of no greater than about 100 nanometers, no greater than about 50 nanometers, no greater than about 20 nanometers, or even no greater than about 10 nanometers; or a thickness in a range of about 0.5 nanometers to about 100 nanometers, in a range of about 2-50 nanometers, or even in a range of about 20-100 nanometers.

Item 49. The composite or method of any one of the preceding items, wherein the composite comprises a zinc oxide based layer for every silver based layer.

Item 50. The composite or method of any one of the preceding items, wherein the composite comprises no more than two zinc oxide based layers.

Item 51. The composite or method of any one of the preceding items, wherein the composite comprises one or more zinc oxide based layers disposed adjacent to a metal based layer.

Item 52. The composite or method of any one of the preceding items, wherein the composite comprises a titanium oxide based layer disposed adjacent to a substrate layer.

Item 53. The composite or method of any one of the preceding items, wherein the composite comprises a titanium oxide based layer disposed adjacent to a metal based layer.

Item 54. The composite or method of any one of the preceding items, wherein the composite comprises one or more zinc oxide based layers having a thickness of at least 0.1 nm, at least 0.5 nm, or at least 1 nm; a thickness of no greater than 100 nm, no greater than 50 nm, no greater than 20 nm, or even no greater than 10 nm; or a thickness in a range of 0.1 nm to 100 nm, 0.5 nm to 50 nm, or even 1 nm to 10 nm.

Item 55. The composite or method of any one of the preceding items, wherein the composite has a visual light transmittance of at least about 60%, at least about 65%, or even at least about 70%.

Item 56. The composite or method of any one of the preceding items, wherein the composite has a visual light transmittance of no greater than 100%, no greater than 95%, or even no greater than 90%.

Item 57. The composite or method of any one of the preceding items, wherein total solar energy rejection of the composite is at least 50%, at least about 52%, at least about 55%, greater than about 55%, at least about 56%, at least about 57%, at least about 58%, at least about 59%, or even at least about 60%.

Item 58. The composite or method of any one of the preceding items, wherein total solar energy rejection of the composite is no greater than 90%, no greater than 80%, or even no greater than 70%.

Item 59. The composite or method of any one of the preceding items, wherein the composite has a light to solar gain ratio of at least about 1.60, greater than about 1.60, at least about 1.61, at least about 1.62, at least about 1.63, at least about 1.64, at least about 1.65, at least about 1.66, at least about 1.67, at least about 1.68, at least about 1.69, or even at least about 1.70.

Item 60. The composite or method of any one of the preceding items, wherein the composite has a light to solar gain ratio of no greater than 1.95, no greater than 1.92, or even no greater than 1.90.

Item 61. The composite or method of any one of the preceding items, wherein the composite has a visual light reflectance of at least 0.5%, at least 1%, or even at least 2%.

Item 62. The composite or method of any one of the preceding items, wherein the composite has a visual light reflectance of no greater than 12%, no greater than 10%, no greater than 8%, or even no greater than 6%.

Item 63. The composite or method of any of the preceding items, wherein the composite comprises a metal oxide based composite layer comprising at least a first metal oxide based layer and a second metal oxide based layer, and wherein the composite further comprises a metal layer adjacent the second metal oxide based layer, and wherein the second metal oxide based layer comprises a metal oxide having a lattice parameter $a_1$; and wherein the metal based layer comprises a metal having a lattice parameter $a_2$, or wherein the silver based layer comprises a silver based compound having a lattice parameter $a_2$; and wherein $a_1$ and $a_2$ satisfy the following formula:

$$([sqrt(2)/2]*a_2)/a_1 = x,$$

where x represents a value of no less than 0.70, no less than 0.75, no less than 0.80, no less than 0.82, no less than 0.84, or no less than 0.86.

Item 64. The composite or method of any of the preceding items, wherein the composite comprises a metal oxide based composite layer comprising at least a first metal oxide based layer and a second metal oxide based layer, and wherein the composite further comprises a metal layer adjacent the second metal oxide based layer, and wherein the second metal oxide based layer comprises a metal oxide having a lattice parameter $a_1$; and wherein the metal based layer comprises a metal having a lattice parameter $a_2$, or wherein the silver based layer comprises a silver based compound having a lattice parameter $a_2$; and wherein $a_1$ and $a_2$ satisfy the following formula:

$$([sqrt(2)/2]*a_2)/a_1 = x,$$

where x represents a value of no greater than 1.5, no greater than 1.4, no greater than 1.3, no greater than 1.2, no greater than 1.1, or no greater than 1.0.

Item 65. The composite or method of any of the preceding items, wherein the composite comprises a metal oxide based composite layer comprising at least a first metal oxide based layer and a second metal oxide based layer, and wherein the composite further comprises a metal layer adjacent the second metal oxide based layer, and wherein the second metal oxide based layer comprises a metal oxide having a lattice parameter $a_1$; and wherein the metal based layer comprises a metal having a lattice parameter $a_2$, or wherein the silver based layer comprises a silver based compound having a lattice parameter $a_2$; and wherein $a_1$ and $a_2$ satisfy the following formula:

$$([sqrt(2)/2]*a_2)/a_1 = x,$$

where x represents a value in a range of from 0.75 to 1.4, from 0.84 to 1.2, or from 0.86 to 1.0.

Item 66. The composite or method of any of the preceding items, wherein the composite comprises a metal oxide based composite layer comprising at least a first metal oxide based layer and a second metal oxide based layer, and wherein the composite further comprises a metal layer adjacent the second metal oxide based layer, and wherein the second metal oxide based layer is essentially free of a titanium oxide.

Item 67. The method of any one of the preceding items, wherein forming the one or more metal based layers, the one or more silver based layers, and/or the one or more metal oxide based layers comprises a sputtering process.

Item 68. The method of any one of the preceding items, wherein forming the one or more metal oxide based layers comprises a sputtering process, and wherein at least one metal oxide based layer is formed at a deposition rate of greater than 1.5 nm·m$^2$·min$^{-1}$·kW$^{-1}$ on a single rotative ceramic target.

Item 69. The method of any one of the preceding items, wherein forming the one or more metal oxide based layers comprises a sputtering process, and wherein at least one metal oxide based layer is formed at a deposition rate of greater than 3 nm·m$^2$·min$^{-1}$·kW$^{-1}$ on a single rotative ceramic target.

Item 70. The method of any one of the preceding items, wherein forming the one or more metal oxide based layers comprises a sputtering process, and wherein at least one metal oxide based layer is formed at a deposition rate in a range of 1.5 nm·m$^2$·min$^{-1}$·kW$^{-1}$ to 10 nm·m$^2$·min$^{-1}$·kW$^{-1}$.

Item 71. The composite or method of any one of the preceding items, wherein the composite is free-standing, and wherein the composite is adapted to be adhered to a transparent material.

Item 72. A window comprising a transparent panel and the composite of any one of the preceding items adhered to the transparent panel.

Item 73. An architectural member or an automotive member comprising a transparent panel and the composite of any one of the preceding items adhered to the transparent panel.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite film comprising:
   a. a substrate layer;
   b. a metal oxide based composite layer comprising at least a first metal oxide based layer and a second metal oxide based layer and
   c. a metal based layer adjacent the second metal oxide based layer; and
   d. a silver based layer adjacent the metal based layer
   wherein the second metal oxide based layer comprises a metal oxide having a lattice parameter $a_1$; wherein the metal based layer comprises a metal selected from the group consisting of gold, platinum, palladium, copper, indium, and combinations thereof; and wherein the metal based layer comprises a metal having a lattice parameter $a_2$, or wherein the silver based layer comprises a silver based compound having a lattice parameter $a_2$; and wherein $a_1$ and $a_2$ satisfy the following formula:

$$([sqrt(2)/2]*a_2)/a_1 = x,$$

where x represents a value of no less than 0.65.

2. The composite film of claim 1, wherein the substrate layer comprises a polycarbonate, polyacrylate, polyester, cellulose triacetated (TCA or TAC), polyurethane, or combinations thereof.

3. The composite film of claim 1, wherein the metal based layer consists essentially of a metal.

4. The composite film of claim 1, wherein the metal oxide based composite layer comprises aluminum oxide, titanium oxide, $BiO_2$, PbO, niobium oxide, zinc oxide, manganese oxide, molybdenum oxide, or combinations thereof.

5. The composite film of claim 1, wherein the metal oxide based composite layer comprises niobium oxide.

6. The composite film of claim 1, wherein the metal oxide based composite layer comprises a zinc oxide based layer.

7. The composite film of claim 6, wherein the zinc oxide based layer comprises AZO.

8. The composite film of claim 1, wherein the metal oxide based composite layer has a thickness of at least about 0.5 nanometers.

9. The composite film of claim 1, wherein the composite film has a visual light transmittance of at least about 60% and no greater than about 100%.

10. The composite film of claim 1, wherein the composite film has a total solar energy rejection of the composite is at least about 50% and not greater than about 90%.

11. The composite film of claim 1, wherein the composite film has a light to solar gain ratio of at least about 1.60 and no greater than 1.95.

12. The composite film of claim 1, wherein x represents a value in a range of from 0.70 to 1.5.

13. The composite film of claim 1, wherein x represents a value in a range of from 0.86 to 1.0.

14. The composite film of claim 1, wherein the second metal oxide based layer is essentially free of a titanium oxide.

15. The composite film of claim 1, wherein the metal based layer has a thickness in a range of about 0.1 nanometers to about 50 nanometers.

16. The composite film of claim 1, wherein the silver based layer consists essentially of silver.

* * * * *